UNITED STATES PATENT OFFICE.

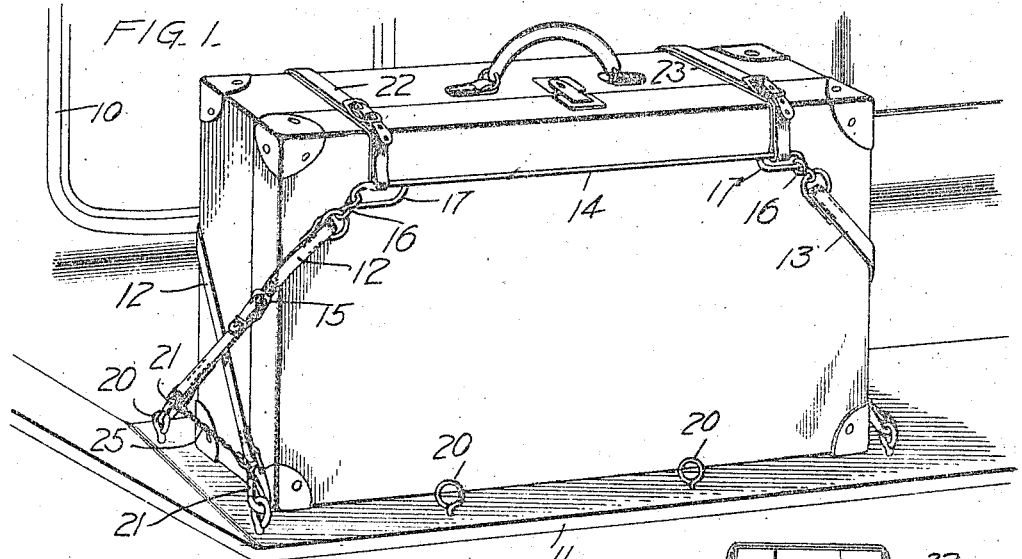

JAMES B. MARQUIS, OF NORWICH, NEW YORK.

BAGGAGE-CARRIER FOR AUTOMOBILES.

1,156,540.

Specification of Letters Patent. Patented Oct. 12, 1915.

Application filed June 2, 1915. Serial No. 31,720.

*To all whom it may concern:*

Be it known that I, JAMES B. MARQUIS, a citizen of the United States, residing at Norwich, Chenango county, State of New York, have invented certain new and useful Improvements in Baggage-Carriers for Automobiles, of which the following is a specification.

This invention relates to improvements in baggage carriers for automobiles and more particularly to a baggage carrier which may be fastened to the running board or other suitable baggage support of an automobile.

The invention herein described constitutes a continuation of my pending application, Serial No. 875,596, filed December 5, 1914.

The object of this invention is to provide a baggage carrier which has flexible non-extensible parts that closely engage the edges or corners of the article of baggage so as to more securely hold it in place on the baggage support.

The above and other objects and the novel features of the invention will be apparent from the following description taken in connection with the drawing, in which—

Figure 1 is a perspective view of a portion of an automobile showing an article of baggage held on the running board thereof by a baggage carrier constructed according to this invention; Fig. 2 is a perspective view showing the baggage carrier embodying my invention in use for mounting an article in different position on the running board; Fig. 3 is an end view of the same; and Fig. 4 is a perspective view of a portion of a baggage carrier in which the flexible members are made of chains instead of straps.

Referring to the drawing and Fig. 1 in particular, 10 designates an automobile which is provided with a running board 11 which constitutes the support for baggage. It will, of course, be understood that any suitable baggage supporting portion of the automobile may be selected upon which to mount the baggage carrier.

The baggage carrier consists of a pair of bail-shaped members which are crossed intermediate their ends and adapted to receive the article of baggage between them. Each bail-like member comprises two flexible non-extensible members 12 and 13 joined together and flexibly connected by a link 14. The portions 12 and 13 of the bail are preferably of some flexible material such as straps and are provided with buckles 15, whereby they may be adjusted in length. The straps 12 and 13 are each connected to the link 14 by hooks 16 which engage the eyes 17 at the ends of the link 14.

The free ends of the straps 12 and 13 are connected to screw-eyes 20 which are fastened to the running board 11. The screw-eyes 20 to which the ends of the bail member are connected are arranged in pairs along the running board and the straps 12 and 13 are provided with snaps 21 at their ends whereby they may be readily engaged and disengaged with the eyes of the screw-eyes.

The bails are crossed at their ends to receive the article of baggage between them and the links 14 thereof are connected together by the buckle straps 22 and 23, which pass through the eyes or loops 17 at the ends of the link 14 and over the article of baggage between the members. The buckle straps 22 and 23 constitute flexible adjustable securing devices to hold the baggage in place and closely fit against the top and corners of the article of baggage. The straps 12 and 13 being provided with buckles 15 may be drawn up tightly and will engage the corners, and sides and ends adjacent the corners of the article of baggage so as to rigidly hold the article in place. The ends of the straps 12 and 13, where they are flexibly secured to the eyes 20, are joined together by a flexible non-extensible member such as the chain 25 to assist in holding the parts together.

In the arrangement shown in Fig. 1 the article, such as a suit-case, is shown as supported in a horizontal position on the running board. However, the running board may have a sufficient number of screw-eyes 20 secured thereto to support the article or articles, such as suit-cases, on end whereby a greater number of articles may be held in place in case the space is limited. Such an arrangement is illustrated in Fig. 2 in which the suit-case is supported on end between the two pairs of screw-eyes which are located much closer together than those to which the baggage in Fig. 1 is attached. It will therefore be seen that by providing four spaced pairs of screw-eyes three suit-cases or similar articles may be secured in place in the manner illustrated in Fig. 2.

The construction of the baggage carrier shown in Fig. 2 is substantially the same as that shown in Fig. 1 except that the straps 26 and 27, to which the link 28 is connected, are considerably longer and the links 28 are considerably shorter than those illustrated in Fig. 1. The straps 26 and 27 are adjustable in the same manner and also are adapted to frictionally engage the corners of the article and the sides and ends adjacent the corners. The straps 26 and 27 are also connected to the screw-eyes 20 by snap-hooks 29 and the ends below the crossed straps are connected together by means of a chain or other flexible device 30. The link 28 is provided with only one eye 31 as it is necessary to provide but one strap 32 to secure the links of the crossed bails together. The strap 32 is, of course, provided with adjustable means 33 so that it may be pulled up tightly to hold the article in place on the support 11. Ordinarily it is preferable with suit-cases and similar articles to use straps or non metallic flexible fastening means so that the baggage carrier will not wear the article due to the friction thereon, but where there is no danger of damaging the baggage carried I prefer to use chains 35 in place of straps, as is illustrated in the detail view in Fig. 4. The chains 35 are secured to the screw-eye 20 in the same manner as the straps, that is by snap-hooks 36 and being flexible will closely engage the corners and adjacent portions of the article of baggage, gripping the article in practically the same manner as the straps do. The chains 35 are, of course, connected together by securing devices which pass over the article of baggage in the same manner as the straps 32, shown in Fig. 2, so that the article of baggage will be securely held in place.

The carrier is so arranged that even a suit-case of unusual thickness will be held in place so that it will not be forced back against the body of the automobile and chafe it. The chain connecting the two crossed straps may be replaced by a strap having a buckle so as to permit of adjustment, and it also serves to prevent the inclosed article from being forced back against the body of the automobile.

The device is readily adjustable to take articles of widely varying proportions and is so constructed that it may be quickly folded up.

While I have shown and described the invention in detail I do not wish to be limited to the exact details illustrated and it is therefore to be understood that minor changes may be made in the device without departing from the spirit of the invention.

Having thus described the invention, what is claimed and desired to be secured by Letters Patent is:

1. In a vehicle, the combination with a support for baggage, of a baggage carrier comprising a pair of members adapted to receive an article of baggage between them, each member having its ends connected to said support at one side of the baggage and being arranged to pass around and engage the opposite side of the baggage, and an adjustable securing device connecting the two members intermediate their ends and passing over the article of baggage between said members.

2. In a vehicle, the combination with a support for baggage, of a baggage carrier comprising a pair of members adapted to receive an article of baggage between them, each member having flexible inextensible portions adapted to frictionally engage the article of baggage at the corners thereof, each member having its opposite ends flexibly connected to said support, and a flexible adjustable securing device connecting the two members intermediate their ends and passing over the article of baggage between said members.

3. In a vehicle, the combination with a support for baggage, of a baggage carrier comprising a pair of bails adapted to receive an article of baggage between them, each bail comprising parts which are readily bendable at the corners of the baggage and adapted to closely engage the article of baggage, means whereby said bails are connected to the support, and an adjustable securing device connecting the two bails intermediate their ends and passing over the article of baggage between them.

4. A baggage carrier for automobiles, comprising the combination of a support for the baggage, a pair of members adapted to receive an article of baggage between them, each member having its ends spaced apart and flexibly connected to said support, each member having flexible portions which closely fit the edges of the baggage at certain points, a link connecting said flexible portions, and an adjustable securing device connecting the members intermediate their ends and passing over the article of baggage between said members.

5. A baggage carrier for automobiles, comprising the combination of a support for the baggage, a pair of crossed members adapted to receive an article of baggage between them, each member having its ends spaced apart and flexibly connected to said support, each member having flexible portions which closely fit the edges of the baggage at certain points, a link connecting said flexible portions and having an eye therein, and an adjustable securing device passing through the eyes of the links and connecting the two members intermediate their ends and passing over the article of baggage between said members.

6. A baggage carrier for automobiles, having in combination a pair of crossed members provided with ends adapted to be flexibly connected to a support and arranged to receive an article of baggage between them, each member comprising a pair of straps or similar flexible portions connected together by a link, a member connecting the straps near their flexible connection to the support, and an adjustable securing device connecting the links of the two members and passing over the article of baggage between said members.

7. A baggage carrier for automobiles, having in combination pairs of eyes secured to the running board of the automobile, a pair of crossed members having their ends flexibly connected to the eyes and so spaced apart as to receive an article of baggage between them, each of said members comprising flexible portions adapted to frictionally engage the sides and corners of the article of baggage between them, a link connecting said flexible portions and provided with an eye, and an adjustable securing device passing through the eyes of said links and over the article of baggage between said members.

In testimony whereof I affix my signature.

JAMES B. MARQUIS.

Witnesses:
　H. R. SARGENT, Jr.,
　J. S. NASH.